United States Patent [19]

Canu et al.

[11] Patent Number: 5,151,952

[45] Date of Patent: Sep. 29, 1992

[54] CHARACTER RECOGNITION APPARATUS WHICH OBTAINS DISTANCE RATIOS BETWEEN EDGES IN A CHARACTER FOR IDENTIFICATION

[75] Inventors: Jean Pierre Canu, Yvetot; Bernard DesForges, Darhetal; Gerard Huette, Rouen, all of France

[73] Assignee: Unisys Corp., Blue Bell, Pa.

[21] Appl. No.: 689,072

[22] Filed: Jun. 14, 1991

[51] Int. Cl.⁵ .............................................. G06K 9/46
[52] U.S. Cl. ......................................... 382/29; 382/22; 382/64
[58] Field of Search ................... 382/7, 22, 29, 64, 11; 235/449

[56] References Cited

U.S. PATENT DOCUMENTS

| | | | |
|---|---|---|---|
| 3,316,536 | 4/1967 | Andrews et al. | 340/146.3 |
| 3,391,387 | 7/1968 | Flores | 340/146.3 |
| 3,585,592 | 6/1971 | Kiji et al. | 340/146.3 AC |
| 4,143,356 | 3/1979 | Nally | 340/146.3 C |

Primary Examiner—Leo H. Boudreau
Assistant Examiner—Andrew W. Johns
Attorney, Agent, or Firm—John B. Sowell; Mark T. Starr

[57] ABSTRACT

An apparatus for recognizing characters 20 on a document 10 comprises a scanning head 24 and decoding circuits 78, 72, 86, 92, 80, feeding a controller 84. The controller 84 detects the identity of the characters 20A-20N by calculating the ratio found by dividing the time between a first positive pulse 32 and a second positive pulse 34 by the time between the first positive pulse 32 and a last negative pulse 36 and comparing it against a stored table of ratios.

8 Claims, 7 Drawing Sheets

CHARACTER RECOGNITION APPARATUS WHICH OBTAINS DISTANCE RATIOS BETWEEN EDGES IN A CHARACTER FOR IDENTIFICATION

The present invention relates to an apparatus for identifying a scanned character from among a predetermined set of characters. It particularly relates to an apparatus for identifying scanned characters on a document.

The present invention is hereinafter described with reference to use in a cheque sorting machine where magnetic ink characters are read from a passing cheque. It is to be understood that the present invention is not limited thereby. The present invention may equally apply to any machine capable of scanning a character by any method and identifying that character.

Character identification is a complex series of operations. A set of characterising signals or vectors is generated by scanning a presented character. The generated signals or vectors are then compared against a set of stored signal vectors (sometimes called Eigenvectors) to determine those storage signal vectors which match the generated signal vectors. Any match signifies identification of the character.

A problem arises between mistakability and identifiability. If too many characteristics are sought for a match, the chances of a character being correctly identified are reduced. The possibility of a single characteristic being incorrectly represented in the detected vector reduces the chances of proper identification even when a character is properly presented.

Conversely, should the number of characteristics tested in the vector signal be too small, there is a high chance that the detected vector signals for one character will be found to match the template for another character. Thus, the chances of mistakibility are increased.

It is therefore desirable to provide a method for detecting the identity of a presented character which is both reliable and simple.

The present invention consists in an apparatus for identifying a scanned character from among a predetermined set of characters, said apparatus comprising: an edge detector for detecting and providing an output indicative of the position of edges in the scanned character; a controller operative to measure a first distance between the first edge and a first selected edge in the scanned character, operative to measure a second distance between the first edge and a second selected edge in the scanned character, and operative to take the ratio between said first and second distances to create a character ratio; said controller comprising a stored set of character signals or vectors each representative of the expected ratio for a respective one of the characters in said pre-determined set of characters; said controller being operative to compare the character ratio with each stored character vector (template) and to provide an indication of that character, from said set, with whose template the character ratio matches.

In order to simplify the operation of the present invention, it is provided that the apparatus includes a level detector for detecting and providing an output which indicates the polarity of the rate of change of intensity of the scanned character with positions; the controller being operative to select the first and second selected edges on the basis of their respective positions in the sequence of edges and also on the basis of polarity indication of the output of the level detector.

The present invention is provided with simple selection means whereby the first selected edge is chosen as the next subsequent edge, after the first edge, where the level detector provides the same output polarity indication, and whereby the second selected edge is the last edge where the level detector provides output indicative of the opposite polarity to that of the first edge.

For preference, the invention is designed for use with the E13B character set and the scanned character is scanned by movement past the detector, the controller calculates the positions of the edges in terms of the times at which they move past the detector. For preference, the scanned character is a magnetic character and the magnetic flux density represents the intensity of the scanned character. Alternatively, the scanned character may be optical and reflected gray level light intensity represents the intensity of the scanned character.

The invention includes an edge detector circuit having a logic comparator in receipt of a representation of the instant rate of change of intensity of the scanned character and in receipt of a delayed representation of the instant rate of change of the intensity of the scanned character, and providing a logical output, indicating by logical polarity the sense of the instant difference between the representation of the rate of change of intensity of the scanned character and the delayed representation of the rate of change of the intensity of the scanned character.

The invention is further explained, by way of an example, by the following description taken in conjunction with the appended drawings; in which:

FIG. 1 shows a document reading station suitable for use with the present invention.

Figure 1:
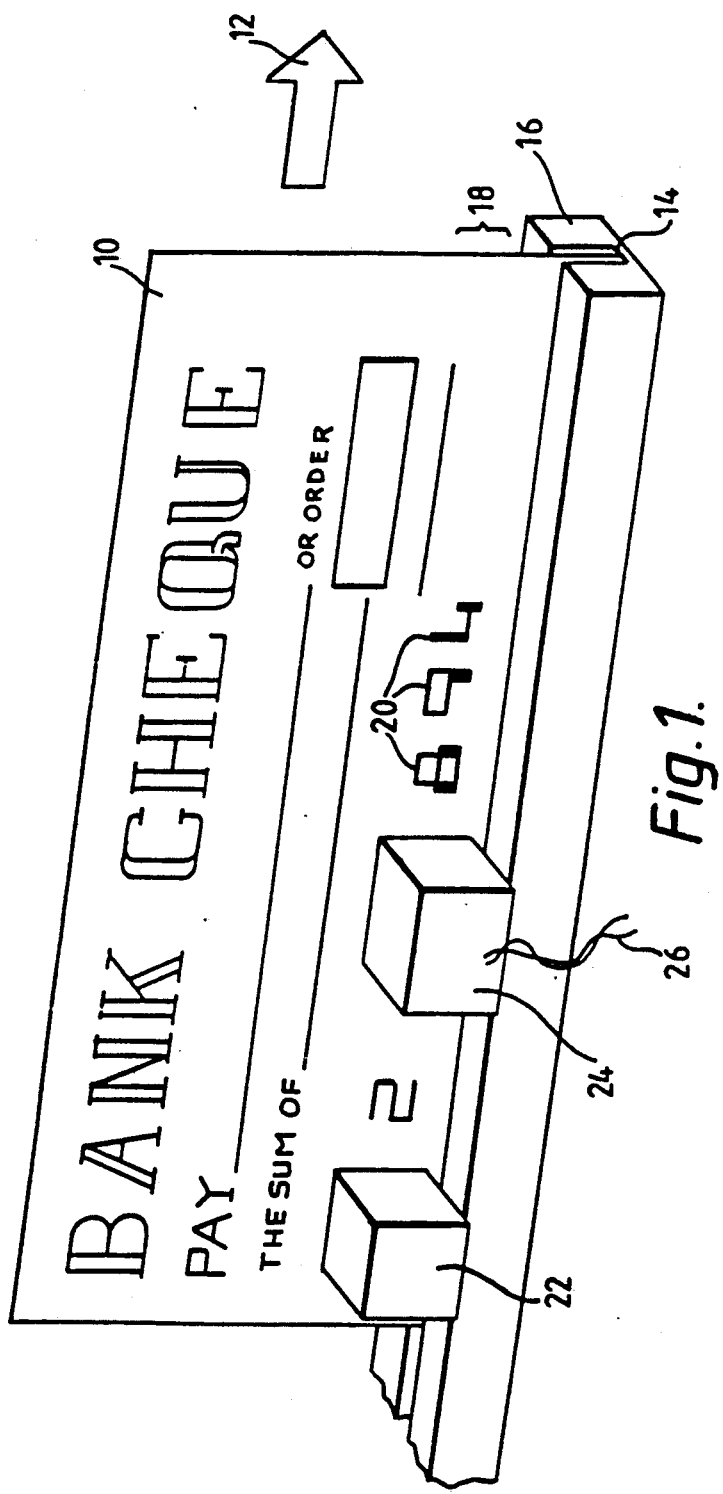
FIG. 1 is an isometric view of a document reading station in a cheque sorting machine suitable for use with the present invention.

A cheque 10 moves, as indicated by arrow 12, along a slot 14 in a track 16, propelled by any means known in the art such as belts, wheels, and the like, none of which is part of the present invention. The cheque 10 comprising a row 18 of printed characters 20. The characters 20 are printed using magnetisable ink. In moving as indicated by the arrow 12, the row 18 of characters 20 first pass a magnetising head 22 and thereafter pass a magnetic pick up head 24. The magnetic pick up head 24 provides an output signal on output wires 26 proportional to the instant rate of change of flux density intercepted by the magnetic pick up head 24 as each character 20 interacts therewith.

As will later be clear, the present invention may also be used with optical characters, in which the magnetic pick up head 24 is replaced with an optical head. The cheque 10 may be any other document wherefrom characters 20 may be read.

Figure 2:
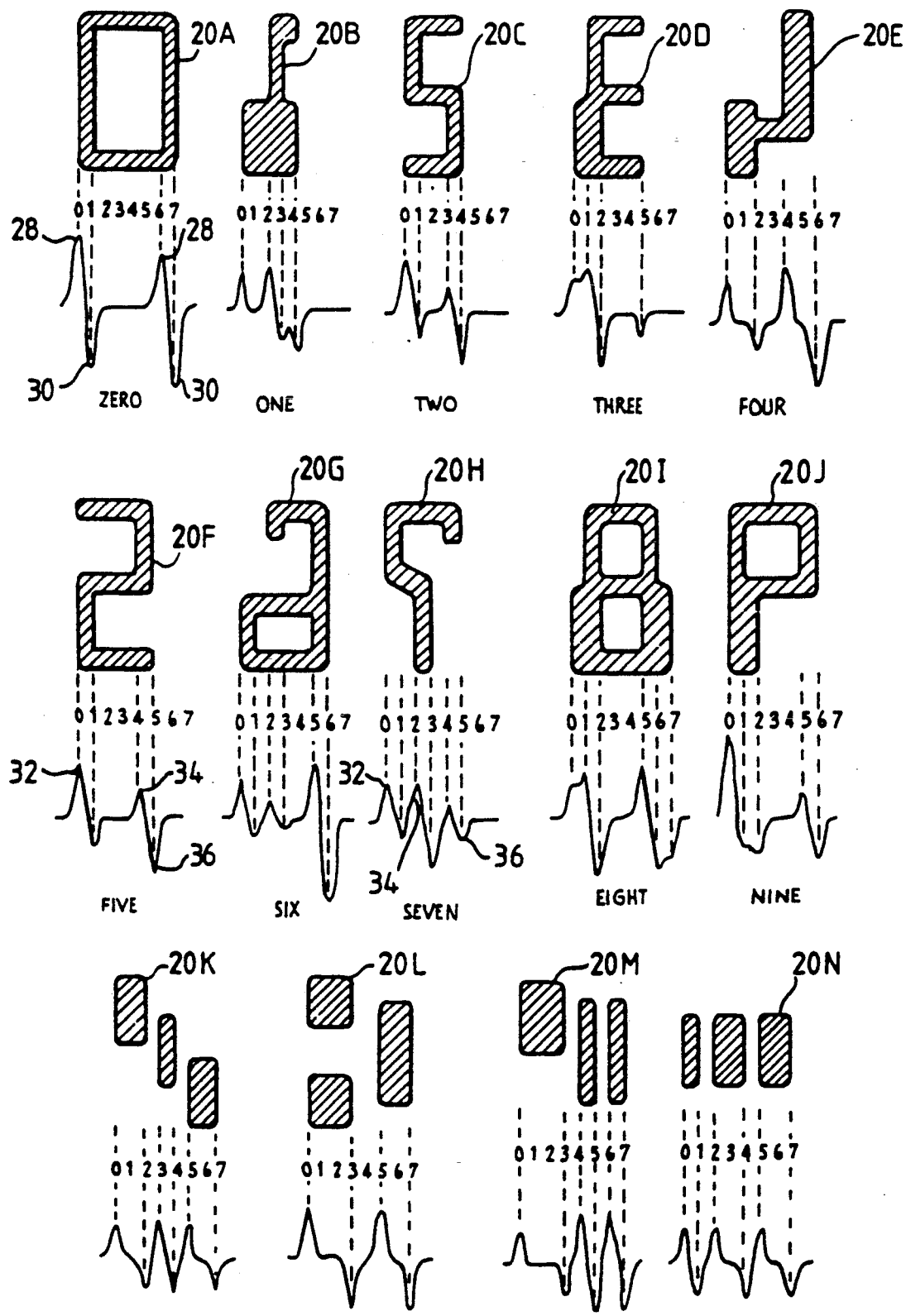
FIG. 2 is an exemplary character set for use with the present invention.

FIG. 2 shows an exemplary set of characters for use with the present invention. Here, the E13B character set is shown where each character 20A-20N is divided into eight epochs or edges indicated immediately therebeneath by the characters 0 to 7. Instantly below is shown the analogue voltage provided on the output wires 26 as the character 20A-20N interacts with the magnetic pick up head 24. The magnetising head 22 magnetises the ink in the character 20A-20N to provide output as indicated in each instance. Typically, the magnetising head 22 can be a permanent magnet, although selectively energisable electromagnets can also be used. Shown only in one character, 20A, for purposes of simplicity, are positive peaks 28 and negative peaks 30. A positive peak 28 is obtained when the rate of change of flux from the character 20A is a maximum and negative peak 30 when the rate of change of flux is maximum in the positive direction and the negative peak 30 is obtained when there is a change of flux density, from the magnetised ink in the character 20A is maximum in the negative direction. The polarity is entirely dependent upon the polarity of the magnetic pick up head 24.

Referring now to a second character 20F, there is identified in the analogue output on the wires 26 a commencing analogue positive maximum peak 32, a subsequent positive peak 34 and a terminating negative peak 36.

Each character 20A-20N is shown in reverse mirror image since this is the order of encounter of each character by the magnetic pick up head 24. For purposes of clarity the commencing positive peak 32, the next subsequent positive peak 34 and the terminating negative peak 36 are shown on a second character 20H so a clear difference may be seen between the peaks 32, 34, 36 in question and other peaks 28, 30 in the waveform.

As will later be described, the purpose of the present invention is to take the ratio found by dividing the time between the first positive peak 32 and the second positive peak 34 by the time between the first positive peak 32 and the terminating negative peak 36.

Figure 3:
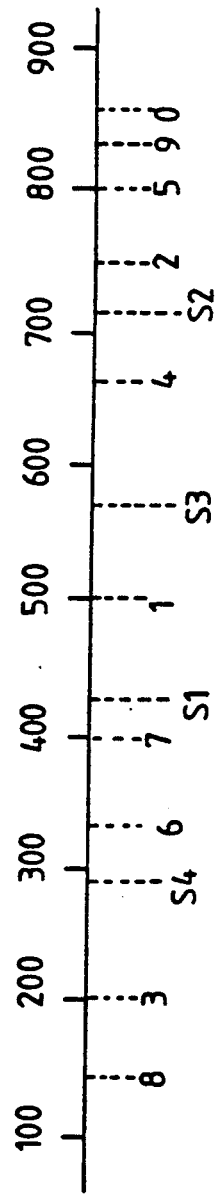
FIG. 3 is a chart illustrating the distribution of ratio values found by the present invention for the character set of FIG. 2.

FIG. 3 shows the results, for each of the characters 20A-20N of FIG. 2, multiplied by a factor of 1000 for clarity. It is seen that the ratio in question is different for each character 20A-20N in the set of FIG. 2.

Figure 4:
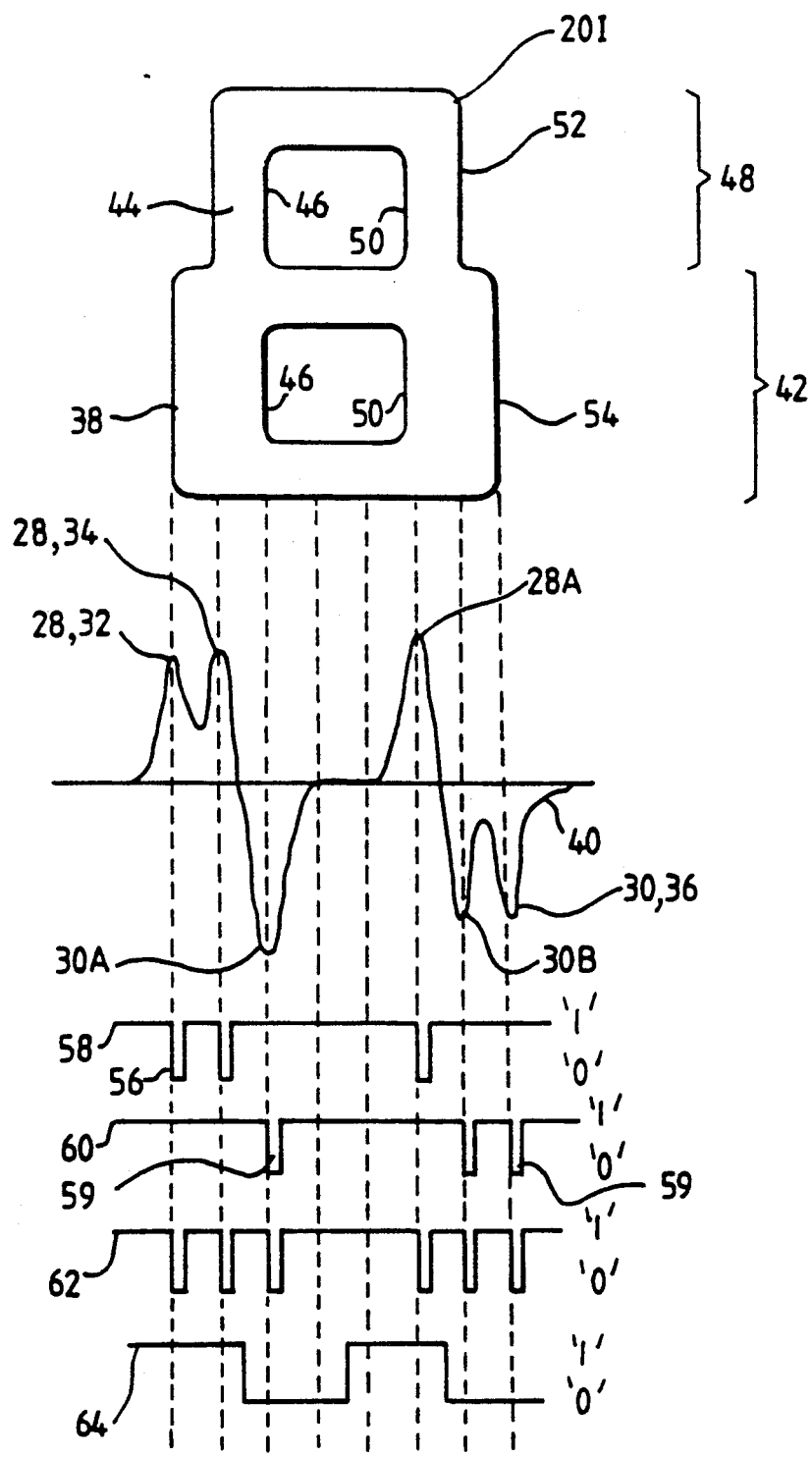
FIG. 4 is an exemplary one of the characters of the set of FIG. 2 illustrating signals derived therefrom by the magnetic head of FIG. 1.

FIG. 4 shows how the analogue waveforms of FIG. 2 are derived. A particular character 20I is chosen by way of example. As a leading edge 38 interacts with the magnetic pick up head 24, so a first positive peak 28, 32 is induced in the analogue voltage 40. The leading edge 38 stretches only over the lower half 42 of the character 20I and is followed shortly thereafter by a second leading edge 44 which induces a second positive peak 28, 34. Immediately thereafter, a trailing edge 46 both in the upper half 48 and the lower half 42 of the character 20I induces a negative peak 30A. A third leading edge 50 in both the upper half 48 and the lower half 42 of the character 20I induces a third positive peak 28A and a second trailing edge 52 induces a second negative peak 30B. Lastly, a final trailing edge 54 induces a terminating negative peak 36. The intermediate pulses 30A, 28A, 30B are of no consequence to the present invention. Only the first positive pulse 28, 32, the second positive pulse 28, 34 and the final negative pulse 30, 36 are of consequence in this embodiment. Those skilled in the art will realise that ratios, other than those here taken, can be used to characterise the characters 20A to 20N. For the purpose of this embodiment, only the three peaks 32, 34, 36 are of relevance.

The positive peaks 34, 32, 28A are used to create negative, brief pulses 56 in a first logic waveform 58. The negative pulses 30A, 30B, 36 are used to create negative, logically false pulses 59 in a second logic waveform 60. The first logic waveform 58 and the second logic waveform 60 are combined to provide a third logic waveform 62 where the negative, logically false pulses 56 of the first logic waveform 58 and the negative, logically false pulses 59 of the second logic waveform 60 are combined.

As well as the third logic waveform, there is also created a sense logic waveform 64 whose polarity or logical condition is indicative of the polarity of the analogue waveform 40 of FIG. 4. If the analogue voltage 40 is positive, the sense logic waveform 64 is logically true. If the analogue waveform 40 is negative, the sense logic waveform 64 is logically false.

Figure 5:
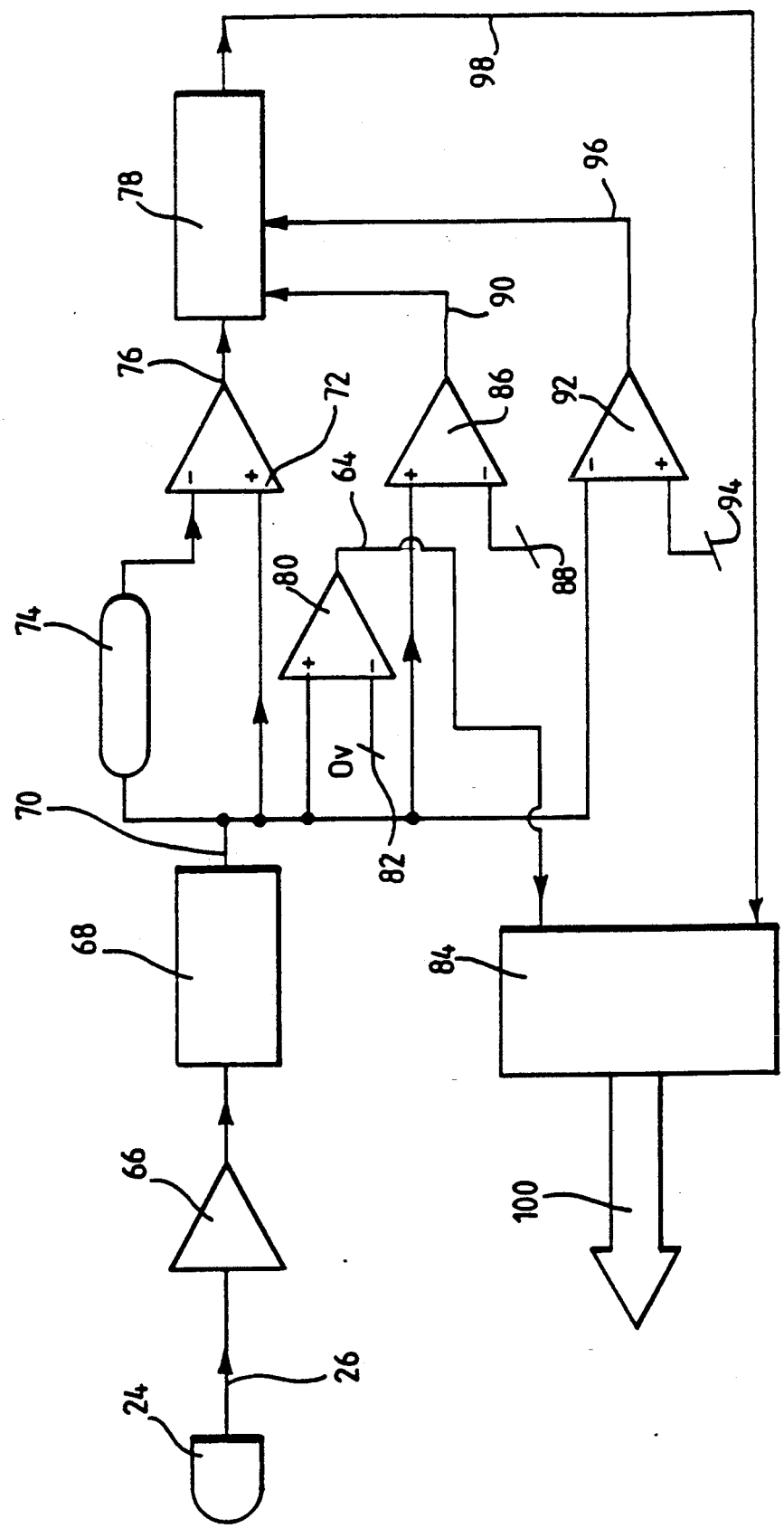
FIG. 5 is a schematic diagram of a peak detector circuit and controller for the present invention.

FIG. 5 is a schematic block diagram of the present invention.

The magnetic pick up head 24 feeds its analogue output 40 via output wires 26 to an amplifier 66 whose output is passed to a low pass filter 68, to eliminate noise. The output 70 of the low pass filter 68 is fed firstly to the non-inverting input of a first voltage comparator 72 and is fed via a delay line 74 to the inverting input of the first voltage comparator 72. The output 76 of the first comparator 72 is fed as input to a edge logic circuit 78.

The output 70 of the low pass filter 68 is fed as input to a second comparator 80 whose output is the sense logic signal 64 of FIG. 4. The output 70 of the low pass filter 68 is compared against a zero volts reference signal 82 and is indicative, by logical polarity, of whether or not the output 70 of the low pass filter 68 is greater or less than the zero volt reference 82.

The output 64 of the second comparator 80 is provided as a first input to a controller 84.

The output 70 of the low pass filter 68 is provided as a non-inverting input to a third voltage comparator 86. The inverting input of the third voltage comparator 86 is provided by a positive voltage reference 88. The third voltage comparator 86 provides an output 90, coupled as further input to the edge logic circuit 78, indicative by logical polarity of whether the output 70 of the low pass filter 68 is greater or less than the positive voltage reference 88. The third voltage comparator 86, as will hereinafter be explained, serves to eliminate the effects of spurious noise in determining whether or not the negative pulses 56 should be provided.

The output 70 of the low pas filter 68 is provided as an inverting input to a fourth voltage comparator 92 whose non-inverting input is provided by a negative voltage reference 94. The fourth voltage comparator 92 provides an output 96 indicative by inverse logical polarity of whether or not the negative magnitude of the output 70 of the low pass filter 68 exceeds the negative magnitude of the negative voltage reference 94. The output 96 of the fourth voltage comparator 92 is provided as a third input to the edge logic circuit 78. The edge logic circuit 78 provides an interrupt input 98 to the controller 84. The controller 84, in turn, by examining the timing of arriving interrupts 98 and the polarity signal 64, determines which of the characters 20A-20N has been scanned by the magnetic pick up head 24 and provides output indicative thereof on the output bus 100.

Figure 6:
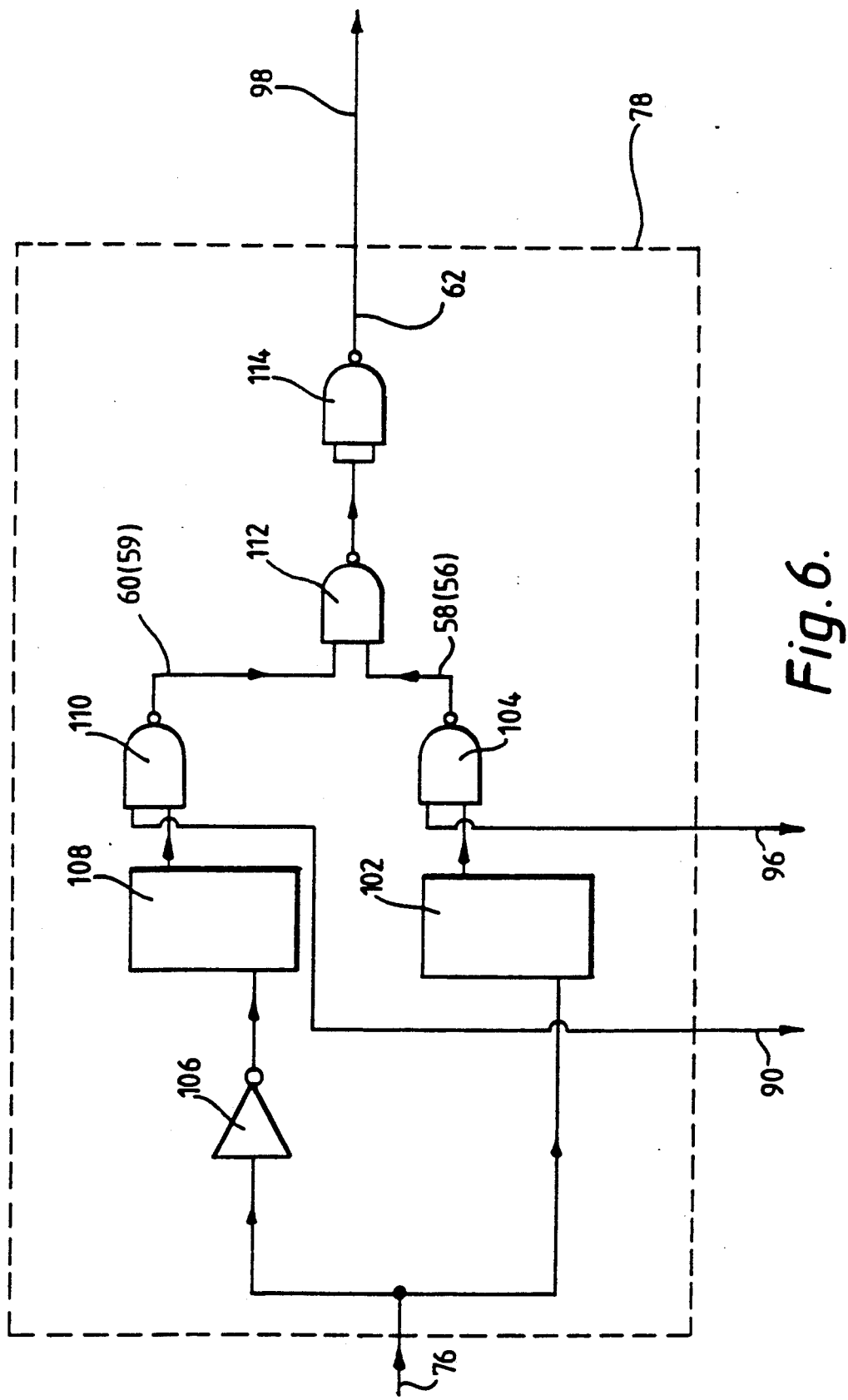
FIG. 6 is edge logic suitable for use with the edge detector circuit of FIG. 5;.

FIG. 6 is a schematic block diagram of the edge logic circuit 78 of FIG. 5.

The output 76 of the first comparator 72 is a logic signal indicative by logical polarity of the type of edges 38, 44, 46, 50, 52, 54 encountered. Every time a leading edge 38, 44, 50 is encountered the output 76 of the first comparator 72 switches from being logically false to being logically true. Every time a trailing edge 46, 52, 54 is encountered in the character the output 76 of the first comparator 72 switches from being logically true to being logically false.

The output 76 of the first comparator 72 is provided, firstly, as a clocking input to a first monostable timer 102 triggered by a rising edge, from false to true, on the output 76 of the first comparator 72. The output of the first monostable 102 is a brief positive pulse gated with the output 96 of the fourth voltage comparator 92 to provide, via a first gate 104 the waveform 58 of FIG. 4.

A first logic invertor 106 inverts the output 76 of the first comparator 72 providing it as a triggering input to a second monostable timer 108. The output of the second monostable timer 108 is a short pulse gated with the output 90 of the third voltage comparator 86 by a second logic gate 110 to produce the signals 60 of FIG. 4. A third logic gate 112 and a fourth logic gate 114 combine the outputs 60, 58 of the second logic gate 110 and the first logic gate 104 to give the signal 62 shown in FIG. 4, provided on the interrupt line 98.

Figure 7:
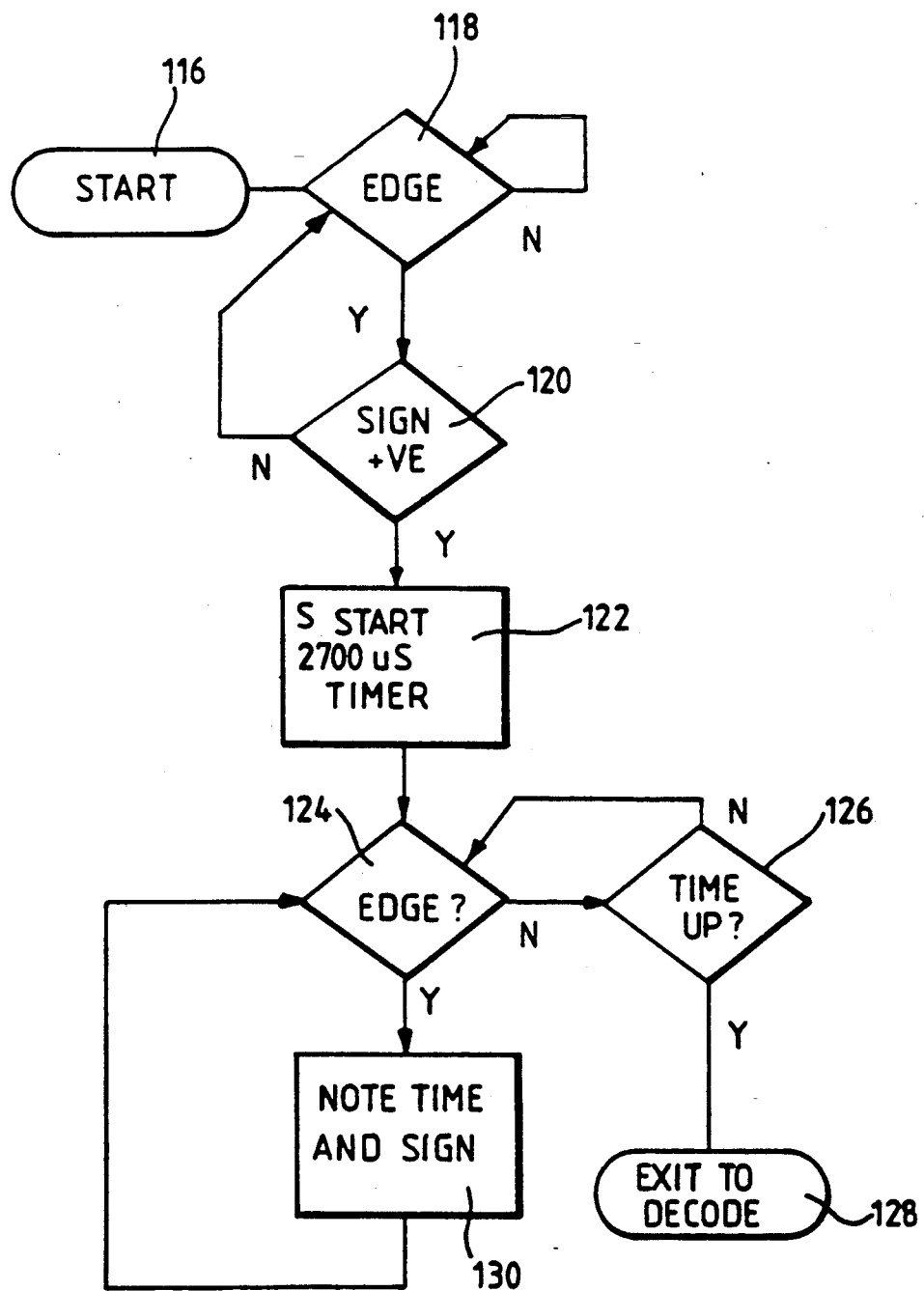
FIG. 7 is a flowchart of the edge information gathering activity of the controller of FIG. 5.

FIG. 7 is a flowchart of the activity of the controller 84 of FIG. 5.

The controller commences from a first start operation 116. Control is passed to a first test 118 which waits to see if a signal is provided on the interrupt line 98. If no signal is provided, the first test 118 continues. If a signal is provided on the interrupt line 98, control is immediately passed to a second test 120 which tests to see if the signal on the sense logic waveform 64 is positive or negative in polarity (i.e. logically true or logically false). If the signal on the sense logic waveform 64 indicates that the sign is not positive (i.e., negative,) on the analogue waveform 40, control is passed back to the first test 118 looking for a further signal on the interrupt line 98.

If the second test 120 detects that the sign is positive on the sense logic waveform 64, control is passed to a first operation 122 which starts a timer. Here, it is presumed that each character 20A to 20N will pass by the magnetic pick up head 24 in a time window of 2,700 microseconds. Those skilled in the art will be aware that other timings could be used depending on the velocity of the document 10. This value is chosen simply by way of example.

The first operation 122 passes control to a third test 124 which seeks edges in the characters 20A-20N by looking for pulses on the interrupt line 98. If no pulse is detected on interrupt line 98, control is passed to a fourth test 126 which checks to see whether the 2,700 microseconds time-out has terminated. If the fourth test indicates that the 2,700 microsecond time-out has not terminated, control is passed back to the third test 124. If the third test 126 detects that the 2,700 microsecond time-out has terminated, control is passed to a first exit operation 128 so that the scanned character may be decoded.

If the third test 124 detects an edge 38, 44, 46, 50, 52, 54 in the character 20A-20N by virtue of a pulse having been received on the interrupt line 98, control is passed to a second operation 130 which notes the exact time of arrival. The second operation 130 then passes control back to the third test 124.

Figure 8:
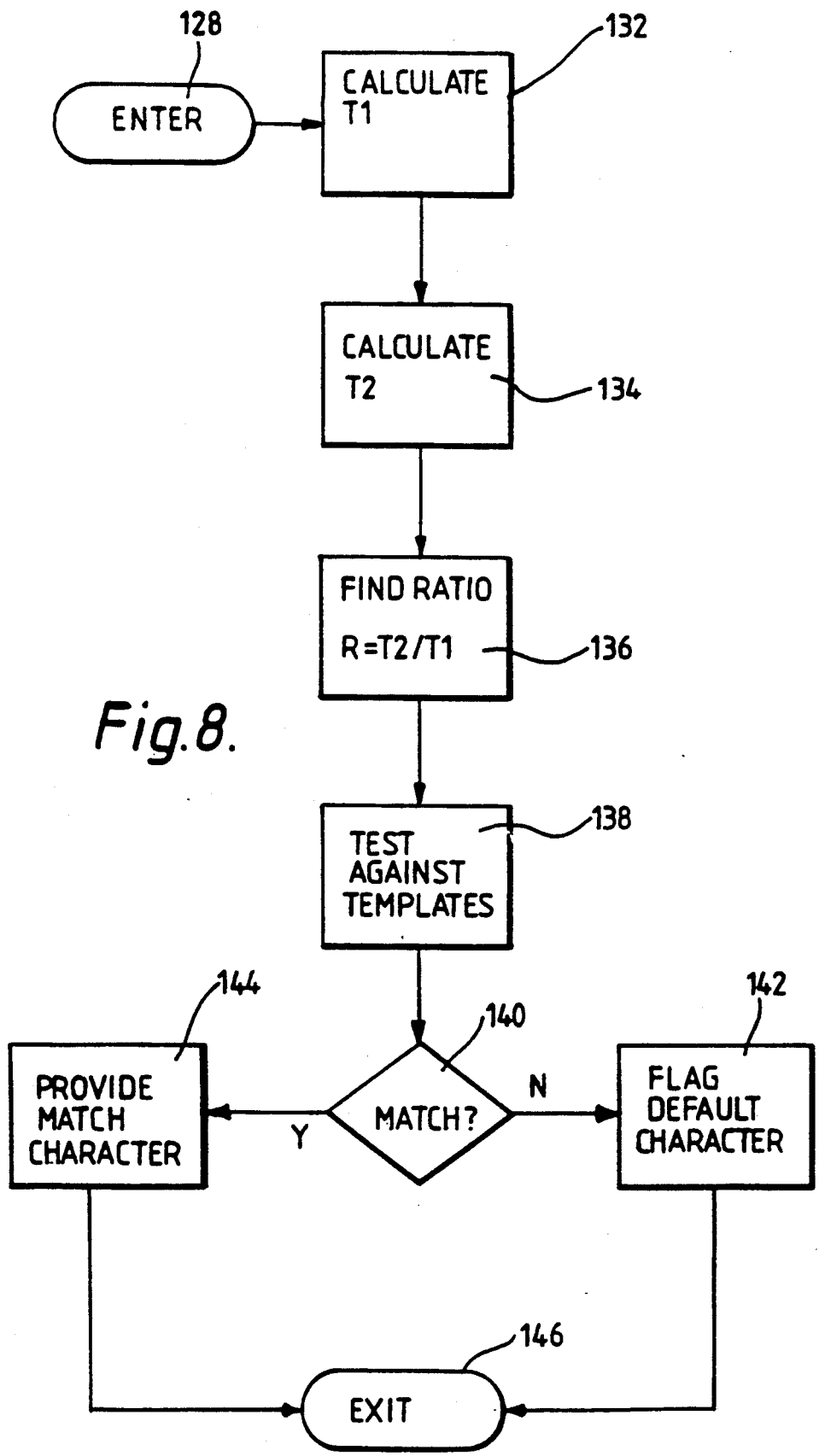
FIG. 8 is a flowchart indicating the match-seeking activity of the controller of FIG. 5.

Having achieved the first exit operation 128 of FIG. 7, control is passed to the flowchart of FIG. 8 where the entry operation 128 is identical to the exit operation 128 of FIG. 7.

The entry operation 128 of FIG. 8 passes control to a third operation 132 which calculates a first time T1, being the interval between the first positive peak 32 and the final negative peak 36, as indicated by the edges received on the interrupt line 98 and the sense logic waveform 64. All other intermediate peaks 34, 30A, 28A, 30B are ignored.

Control is then passed to a fourth operation 134 which calculates the second time T2, being the interval between the first positive peak 32 and the next, subsequent positive peak 34. Control is then passed to a fifth operation 136 which calculates the ratio T2/T1. This ratio is then tested against templates in a sixth operation 138 according to the values shown in Table 1.

TABLE 1

| Character | T1 | T2 | Ratio · 1000 |
|---|---|---|---|
| 0 | 6 × 330 us | 7 × 330 us | 857 |
| 1 | 2 × 330 us | 4 × 330 us | 500 |
| 2 | 3 × 330 us | 4 × 330 us | 750 |
| 3 | 1 × 330 us | 5 × 330 us | 200 |
| 4 | 4 × 330 us | 6 × 330 us | 667 |
| 5 | 4 × 330 us | 5 × 330 us | 800 |
| 6 | 2 × 330 us | 6 × 330 us | 333 |
| 7 | 2 × 330 us | 5 × 330 us | 400 |
| 8 | 1 × 330 us | 7 × 330 us | 143 |
| 9 | 5 × 330 us | 6 × 330 us | 833 |
| S1 | 3 × 330 us | 7 × 330 us | 429 |
| S2 | 5 × 330 us | 7 × 330 us | 714 |
| S3 | 4 × 330 us | 7 × 330 us | 571 |
| S4 | 2 × 330 us | 7 × 330 us | 286 |

Control is passed to a fifth test 140 which checks to see whether the Ratio matches with any of the templates to within a pre-determined percentage of accuracy. Each template corresponds to the ratio shown in Table 1 on the right hand column. For convenience, in Table 1, the ratio has been multiplied by a factor of 1000. It is to be appreciated that other factors to clarify the ratio can be used. If no match is found by the fifth test 140, control is passed to a seventh operation 142 which flags the character set, stored by the operations of FIG. 7, as a default character, undecoded.

If the fifth test 140 detects a match, control is passed to an eighth operation 144 which provides indication of the match found on the output bus 100 of the controller 84.

The seventh operation 142 provides its default character on the output bus 100. Both the seventh operation 142 and the eighth operation 144 pass control to a second exit operation 146 corresponding to the first start operation 116 of FIG. 7. The system is thus ready to detect and decode further characters 20A to 20N.

It is a characteristic of magnetic characters 20 that the analogue signal 40 derived by the magnetic pick up head 24 is proportional to the instant time rate of change of the magnetic flux density. Should optical characters 20 be used, it will be necessary to provide a differentiator in series with the amplifier 66 of FIG. 5.

While the present invention has been described with reference to a document passing at constant speed passed the detector, it is to be realised that the present invention relies merely upon detecting the position of edges on a character 20A-20N. The scanning can thus be achieved using television cameras and other image capture devices. The operation of FIG. 7 would then note the position rather than the time of each edge in the captured image.

What is claimed is:

1. An apparatus for identifying a predetermined font character moving relative to a scanning head from among a predetermined set of characters, said apparatus comprising:
   edge detector means for scanning the character and providing a single analog output signal indicative of the position of the leading and trailing edges in the scanned character;
   controller means operative to measure a first distance between the first leading edge and a first selected edge in the scanned character,
   also being operative to measure a second distance between the first leading edge and a second selected edge in the scanned character,
   controller means operative to measure a first distance between the first leading edge and a first selected edge in the scanned character,
   also being operative to measure a second distance between the first leading edge and a second selected edge in the scanned character,
   and operative to take the ratio between said first and second distance to create a novel character ratio;
   said controller means comprising a stored set of character signals each representative of the expected ratio for a respective one of the characters in said predetermined set of characters;
   said controller means being operative to compare the character ratio with each character signal and to provide an indication of the character, from said set, with whose character signals the character ratio matches.

2. An apparatus according to claim 1 wherein said detector means includes a level detector for detecting and providing an output indicative of the polarity of the rate of change of intensity of the scanned character with position; said controller means being operative to select said first and second selected edges on the basis of their respective positions in the sequence of edges and the polarity indication of said output of said level detector.

3. An apparatus according to claim 2 wherein said first selected edge is the next subsequent leading edge, after said first leading edge, and where said level detector provides an output indicative of the same polarity as for said first leading edge; and wherein said second selected edge is the last trailing edge where said level detector provides an output indicative of the opposite polarity to that for said first edge.

4. An apparatus according to claim 3 wherein said predetermined set of characters is the E13B character set.

5. An apparatus according to claim 1 wherein said scanned character is scanned by movement past said edge detector means, said controller means being operative to calculated position in terms of the instant times of passage of edges past the detector means.

6. An apparatus according to claim 1 wherein said scanned character is a magnetic character, and wherein magnetic flux density represents the intensity of the scanned character.

7. An apparatus according to claim 1 wherein the scanned character is optical, and wherein gray level light intensity represents the intensity of the scanned character.

8. An apparatus according to claim 5 wherein said edge detector means includes an edge detector circuit comprising a logic comparator coupled to receive a representation of the instant intensity of the scanned character and further coupled to receive a delayed representation of the instant intensity of the scanned character, and being operative to provide a logical output, indicative by polarity of the sense of the instant difference between said representation of the intensity of the scanned character and said delayed representation of the instant intensity of the scanned character.

* * * * *

UNITED STATES PATENT AND TRADEMARK OFFICE
CERTIFICATE OF CORRECTION

PATENT NO. : 5,151,952

DATED : September 29, 1992

INVENTOR(S) : Jean Pierre Canu, Bernard Des Forges and Gerard Huette

It is certified that error appears in the above-identified patent and that said Letters Patent is hereby corrected as shown below:

On the title page: ITEM [30] Foreign Application Priority Date

October 23, 1990 PCT/US90/06134
    October 24, 1989 [GB] United Kingdom 89-23959--.

Signed and Sealed this

Sixteenth Day of November, 1993

*Attest:*

BRUCE LEHMAN

*Attesting Officer*      *Commissioner of Patents and Trademarks*